Patented July 16, 1935

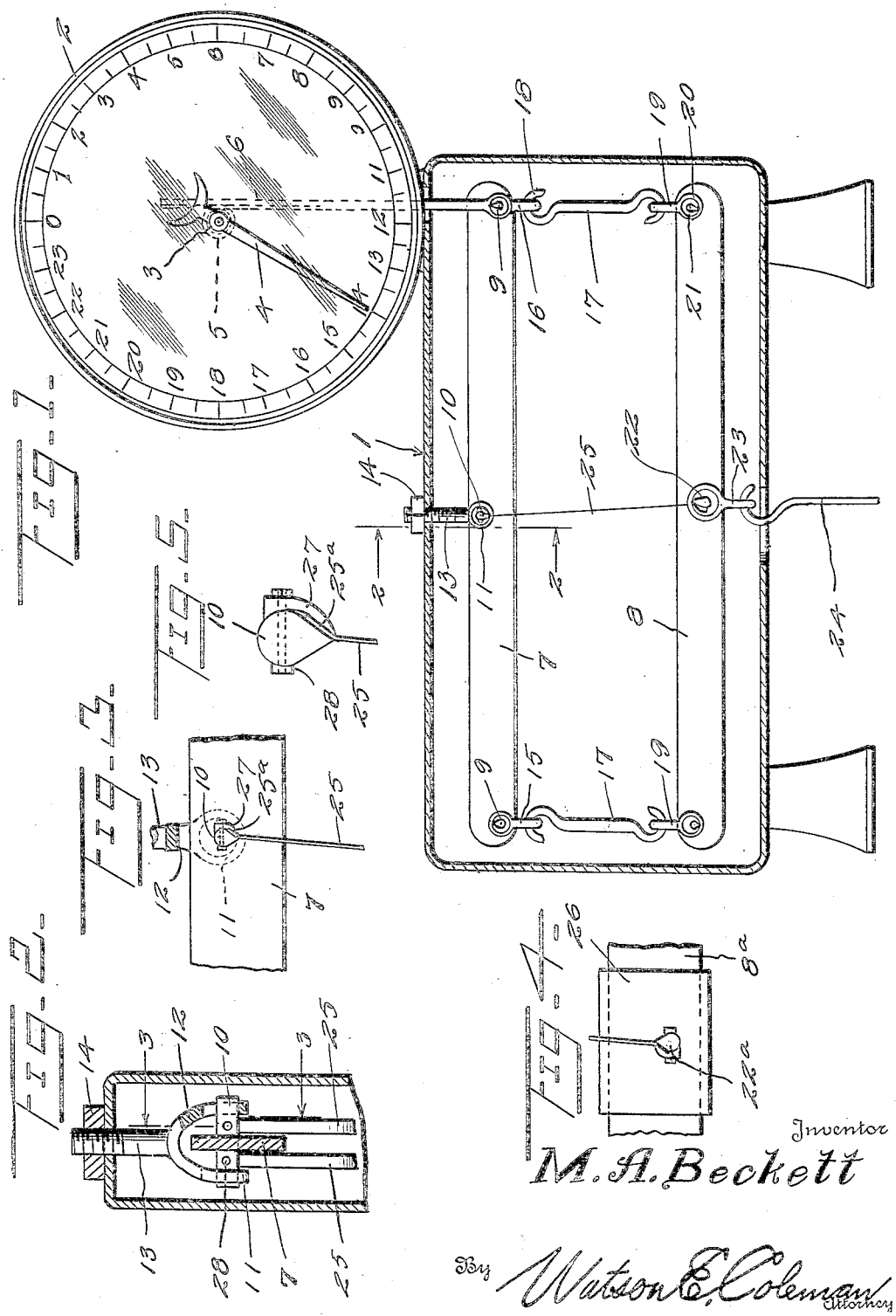

2,008,126

UNITED STATES PATENT OFFICE 2,008,126

WEIGHING APPARATUS

Merrill A. Beckett, Detroit, Mich.

Application June 12, 1934, Serial No. 730,295

8 Claims. (Cl. 265—59)

This invention relates to the class of scales and pertains particularly to improvements in automatic weighing scales.

The primary object of the present invention is to provide an improved type of weighing machine which will be entirely automatic in its operation in that no hand adjustment of any of the parts is necessary in effecting a weighing operation, and which entirely eliminates springs or other devices where the flexing of metallic parts is depended upon for obtaining accurate results.

Another object of the invention is to provide an automatic weighing machine having means which is adjustable or may be made adjustable to vary the weighing capacity of the scale or to compensate for the weigher elements thereof.

The invention will be best understood from a consideration of the following detailed description taken in connection with the accompanying drawing forming part of this specification, with the understanding, however, that the invention is not confined to any strict conformity with the showing of the drawing but may be changed or modified so long as such changes or modifications mark no material departure from the salient features of the invention as expressed in the appended claims.

In the drawing:—

Figure 1 is a sectional view through the mechanism enclosing housing for the present invention, showing the working parts thereof in elevation.

Figure 2 is a sectional view taken on the line 2—2 of Figure 1.

Figure 3 is a sectional view taken on the line 3—3 of Figure 2.

Figure 4 is a view of a modified construction of a portion of the mechanism.

Figure 5 is an enlarged detail of one knife bearing arm showing a method of clamping the retarder thereto.

Referring to the drawing wherein like numerals of reference designate corresponding parts throughout the several views, the numeral 1 indicates a housing of any suitable character for enclosing the moving parts of the present weighing machine, upon which housing may be mounted the dial casing 2 in which is an oscillatable shaft 3 which carries a pointer 4. The shaft 3 may have mounted thereon a gear which is illustrated in dotted lines and indicated by the numeral 5, with which connects a rack 6 which is connected with the moving parts of the scale mechanism located in the housing 1.

The improved mechanism comprises the two lever bars 7 and 8, which are disposed in the housing 1, one above and in spaced parallel relation with the other. The upper lever 7 carries at each end oppositely directed knife bearing arms 9, which have their edges directed upwardly and at its center, the oppositely directed knife bearing arms 10 which have their edges directed downwardly. The bearing arms 10 engage in bearing yokes 11 formed at the ends of the two arms 12, which form downward extensions of the suspended bolt 13. This suspension bolt 13 is threaded and passes upwardly through the top of the housing 1 to receive the retaining nut 14.

The bearing arms 9 at the ends of the upper lever 7 carry hangers 15 and 16, the hanger 16 being, as illustrated in Figure 1, integrally connected with the rack bar 6 which extends upwardly into the indicator housing 2 and is in gear connection with the small gear or pinion 5. Each of these hangers 15 and 16 has yokes similar to the yokes 11 suported by the suspension bolt 13, in which the knife arms 9 engage.

Depending from each of the hangers 15 and 16, is a hanger bar 17 which is formed at each end into a hook 18. The lower hook of each bar 17 engages through a hanger yoke 19 of similar construction to the hanger yoke 15, each of which straddles the lower lever bar 8 adjacent one end to receive in the eyes 20 which are integral with the yokes, the bearing knives 21, which have their edges directed downwardly as illustrated. It will thus be seen that the lower bar 8 is suspended from the upper bar 7 by means of the yokes 15, 16 and 19, and the hanger bars 17.

Adjacent to the transverse center of the lower lever bar 8 are disposed the laterally extending bearing knives 22, the edges of which are directed upwardly as illustrated, and these knives support a depending hanger yoke 23 of substantially the same construction as the yokes 19.

This hanger yoke 23 carries the portion of the scale which is provided to support the material to be weighed and in the illustration of the invention, it is shown as having a hooked weight bar 24 connected therewith, the lower end of which may be formed in any suitable manner or connected with any suitable platform or receptacle to facilitate the hanging of material thereon to be weighed by the scales.

Disposed upon the two sides of the plane in which the lever bars 7 and 8 are disposed, are strips or bands of spring steel which are indicated by the numerals 25 and which, because of their action in connection with the operation of the scales, may be referred to as retarders. Each of these bands has its upper end disposed against one side face of a knife arm 11 while at its lower end, it overlies the opposite side of a lower knife arm 22. The ends 25ᵃ of these bands are held in position against their respective knife arms in any suitable manner, as, for example, by the use of a clamp element 27 which is secured to the adjacent knife arm by means of a bolt 28, which passes through the arm. By means of these retarders 25, the oscillation or movement of the bars 7 and 8 is controlled.

From the foregoing, it will be apparent that since the pivot or knife arms 22 are connected to and carried by the lower lever bar 8 at one side of the transverse center of this bar, any weight applied to the weight bar 24 which is carried by the arms 22 will cause the lever bar 8 to swing or oscillate so that the end nearest which the pivot arms 22 are disposed will be depressed and the opposite end will be correspondingly raised. This will cause a similar oscillation of the bar 7 through the medium of the links 17 and consequently a reciprocal movement of the rack 6 and rotation of the pointer 4.

When this movement of the lever bars 7 and 8 occurs, the upper and lower ends of the retarder bands 25 will be flexed across the area adjacent the edges of the knives to which they are attached. This flexion of the bands 25 will create a smooth easy swinging of the lever bars to the point where the weight applied to the hanger 24 is counteracted by the weight of the ends of the lever bars which are being raised and when a perfect balance is obtained, the parts of the scale will cease moving at once and the weight of the article attached to the hanger bar 24 will be immediately indicated by the pointer 4. After the weight has been removed from the hanger 24, the reaction of the retarders will assist in returning the bars 7 and 8 to normal horizontal position. By means of these retarders, the movement of the lever bars is not fluctuating as in the case of spring or weight controlled weighing machines, but the parts move smoothly to a balanced condition and immediately come to rest, when a body is applied for weighing and when it is removed.

As will be obvious, by changing the location of the arms 22 along the bar 8, the greater or lesser degree of movement of the bar 8 and the upper bar will be obtained with a consequent change in the degree of movement of the pointer.

While it is contemplated to adjust the pivot knives 22 to the proper position when the weighing machine is constructed, it may be found advisable to provide means whereby these arms may be moved upon the supporting bar 8, therefore, there has been illustrated in Figure 4, a yoke 26 which is shown slidably mounted upon a bar 8ᵃ, which corresponds with the lever bar 8 of the construction illustrated in Figure 1. This yoke carries the knife blade pivot arms 22ᵃ which correspond to the arms 22, instead of the lever bar as in the construction shown in Figure 1, and the retarder bands are secured to these arms 22ᵃ.

While the bands 25 have been illustrated as having their ends connected to the pivot knives 10 and 22 by means of clamps, it is to be understood that this is only illustrative of one means of so securing these elements and it is not intended to limit the invention to this particular construction. It is also to be understood that while the rack 6 is shown integral with the yoke 16, it is within the purview of the invention to connect the rack bar to the lever bar 7 in other ways if it is found desirable to do so.

In addition to the retarder bands 25, the scale levers may have associated therewith dashpots to control their oscillation if this is considered necessary. Since the use of such elements in association with oscillatable members is well understood, the same have not been illustrated, but it is to be understood that the same may be used in association with the scale structure if found desirable.

What is claimed is:—

1. In a weighing machine, a pair of lever bars disposed one above the other in spaced parallel relation, means oscillatably supporting one of said lever bars intermediate its ends, means oscillatably coupling the levers together at their adjacent ends, means for suspending a body to be weighed from the other or lower one of the lever bars from a point at one side of the transverse center of the lever bar, an indicator, and means for actuating the indicator from and upon the oscillation of the lever bars.

2. In a weighing machine, a pair of lever bars disposed one above the other in spaced parallel relation, means oscillatably supporting one of said lever bars intermediate its ends, means oscillatably coupling the levers together at their adjacent ends, means for suspending a body to be weighed from the other or lower one of the lever bars from a point at one side of the transverse center of the lever bar, an indicator, means for actuating the indicator from and upon the oscillation of the lever bars, and means for controlling the oscillation of the lever bars.

3. In a weighing machine, a pair of lever bars disposed one above the other in spaced parallel relation, means for oscillatably suspending the upper one of said bars at its transverse center, means oscillatably coupling the adjacent ends of said bars together, load carrying means oscillatably connected with the lower one of the lever bars at one side of its transverse center, an indicator, coupling means between a bar and the indicator for effecting actuation of the indicator by the movement of the bar, and resilient means connecting between the bars and placed under strain by the oscillation of the same for retarding the said oscillation.

4. In a weighing machine, a pair of lever bars disposed one above the other in spaced parallel relation, means for oscillatably suspending the upper one of said bars at its transverse center, means oscillatably coupling the adjacent ends of said bars together, load carrying means oscillatably connected with the lower one of the lever bars at one side of its transverse center, an indicator, coupling means between a bar and the indicator for effecting actuation of the indicator by the movement of the bar, and bars of resilient material connecting the lever bars between the point of suspension for the top bar and the point of suspension of the load carrier and acting to retard the oscillatory movement of the lever bars.

5. In a scale or weighing machine, a pair of bars disposed one above the other, pivotal supporting means for the upper bar substantially midway of its ends, connecting elements between the ends of the two bars and pivotally connected therewith, means pivotally suspended from the lower bar adjacent to and at one side of the transverse center for suspending a body therefrom, means for indicating the degree of movement of the bars, and a flexible element connecting the pivotal supporting means with the second mentioned means and which is affected tensionally with the movement of the bars.

6. In a weighing machine, a pair of bars disposed one above the other, knife bearing arms extending from the opposite sides of the upper bar midway of the ends thereof, bearing yokes having said knives therein, a pair of bearing knives extending from opposite sides of the lower bar at one side of the transverse center, a bearing yoke suspended from the last mentioned knives, means for suspending a body to be weighed from the last mentioned yoke, link elements disposed between the ends of the bars and having pivotal connection with the same, indicating means, means coupling the indicating means with a bar whereby movement of the latter will effect the indicating means, and a band of resilient material extending from a knife arm of the upper bar to a knife arm of the lower bar and secured to said arms whereby the band will be flexed upon the oscillation of the bars.

7. In a weighing machine, a pair of bars disposed one above the other, knife bearing arms extending from the opposite sides of the upper bar midway of the ends thereof, bearing yokes having said knives therein, a pair of bearing knives extending from opposite sides of the lower bar at one side of the transverse center, a bearing yoke suspended from the last mentioned knives, means for suspending a body to be weighed from the last mentioned yoke, link elements disposed between the ends of the bars and having pivotal connection with the same, indicating means, means coupling the indicating means with a bar whereby movement of the latter will effect the indicating means, a band of resilient material extending from a knife arm of the upper bar to a knife arm of the lower bar and secured to said arms whereby the band will be flexed upon the oscillation of the bars, and means for changing the location of the knife arms carried by the lower bar with respect to the transverse center of that bar.

8. In a weighing machine, a pair of bars disposed one above the other, knife bearing arms extending from the opposite sides of the upper bar midway of the ends thereof, bearing yokes having said knives therein, a yoke mounted upon the lower bar for movement longitudinally thereon, a pair of knife bearing arms carried by said yoke and projecting from opposite sides of the adjacent bar, a bearing yoke suspended from the last mentioned knives, means for suspending a body to be weighed from the last mentioned yoke, link elements disposed between the ends of the bars and having pivotal connection with the same, indicating means, means coupling the indicating means with a bar whereby movement of the latter will effect the indicating means, and a band of resilient material extending from a knife arm of the upper bar to a knife arm carried by said yoke and secured to said arms whereby the band will be flexed upon the oscillation of the bars.

MERRILL A. BECKETT.